United States Patent [19]

Hofmann et al.

[11] Patent Number: 4,564,276
[45] Date of Patent: Jan. 14, 1986

[54] MICROFILM SENSING DEVICE WITH A PROJECTION LAMP AND COLD-LIGHT MIRROR

[75] Inventors: Wilfried Hofmann; Herbert Lusch, both of Taufkirchen; Walter Rauffer, Steinebach; Eberhard Zieran, Grünwald; Jürgen Sylla, Sauerlach-Arget, all of Fed. Rep. of Germany

[73] Assignee: Agfa-Gevaert Aktiengesellschaft, Leverkusen, Fed. Rep. of Germany

[21] Appl. No.: 580,543

[22] Filed: Feb. 15, 1984

[30] Foreign Application Priority Data

Mar. 25, 1983 [DE] Fed. Rep. of Germany ....... 3310850

[51] Int. Cl.$^4$ .............................................. G03B 21/28
[52] U.S. Cl. ....................................... 353/55; 353/77
[58] Field of Search .................................. 353/74–78, 353/55, 52, 98, 99, 122, 84, 85

[56] References Cited

U.S. PATENT DOCUMENTS 2,852,980  9/1958  Schroder ......................... 353/55 X
3,733,121  5/1973  Smitzer ............................ 353/78 X
3,944,320  3/1976  McLintic ......................... 353/55 X

FOREIGN PATENT DOCUMENTS 916358  7/1955  Fed. Rep. of Germany ........ 353/55

Primary Examiner—Harry N. Haroian
Attorney, Agent, or Firm—Michael J. Striker

[57] ABSTRACT

An apparatus for sensing microfilms is provided in addition to visible light with a projection lamp for radiating infrared rays which pass through a cold-light mirror to a platform on which a microfilm is disposed. The apparatus is further provided with a projection lens positioned above the microfilm platform. The path of rays is directed from the microfilm platform through the projection lens and then is projected onto an image screen or other sensing surface, for example CCD-device. For adjusting the apparatus for various light spectrum combinations the apparatus is provided with at least one infrared component-reflecting mirror which is displaceable or pivotable to and from the path of illumination rays radiated from the projection lamp.

15 Claims, 5 Drawing Figures

MICROFILM SENSING DEVICE WITH A PROJECTION LAMP AND COLD-LIGHT MIRROR

BACKGROUND OF THE INVENTION

The present invention relates to an apparatus for sensing microfilms and which in addition to visible light is provided with a projection lamp radiating infrared-component rays.

Devices for sensing microfilms of the type under consideration are known in the art. In such devices, a beam of rays radiated from the projection lamp is directed through a cold-light mirror to a microfilm platform, then through a projection lens and is finally projected to an image screen or other sensing means, such as a charge coupled device (abbreviated CCD). If such a device is utilized for a mechanical sensing by means of a sensing pin or for scanning with CCD for video transmission then a scanned enlarged microimage must have an enlarged infrared component. On the other hand, the microfilm would be quickly bleached out due to a continuously acting illumination with a great infra-red component.

SUMMARY OF THE INVENTION

It is an object of the present invention to provide an improved device for sensing microfilms.

It is another object of the present invention to provide an illumination system in the device for sensing microfilms, which would selectively provide an increased or decreased infrared component and for a very short period of time if desired.

These and other objects of the invention are attained by a device for sensing microfilms, comprising in addition to visible light a projection lamp radiating infrared-component rays; a cold-light mirror adapted to receive from said lamp radiation rays in a predetermined path; a microfilm platform for receiving a microfilm thereon; a projection lens positioned above said platform; a microfilm sensing means; said rays passing onto said cold-light mirror from said lamp, then onto said platform and being directed to said projection lens from which they are projected to said microfilm sensing means; at least one infrared component-reflecting mirror; and means for selectively moving said infrared component-reflecting mirror into and away from said path of the rays before said microfilm platform.

The device may further include a heat-protective screen positionable in said path before said platform and selectively movable into and away from said path.

The aforementioned moving means may include a guide and a slide displaceably positioned in said guide, said slide carrying said cold-light mirror and said infrared component-reflecting mirror thereon and being operative for selectively positioning said cold-light mirror or said infrared component-reflecting mirror in said path of rays.

The moving means may further include an actuating handle connected to said slide and a spring tensioned against said guide, said slide being displaceable by said handle and under the action of said spring into and from a position in which said cold-light mirror lies in said path of the rays.

Two different infrared component-reflecting mirrors may be provided in the inventive device.

The moving means may include a pivotable supporting member of a prismatic shape having three supporting sides, said cold-light mirror being positioned on one of said sides and said two infrared component-reflecting mirrors being positioned on two remaining sides of said supporting member. These moving means may further include a turnable shaft extending through an axis of symmetry of said supporting member, which is turned to position one of said mirrors in said path of the rays. The moving means may further include a step motor connected to said shaft.

The cold-light mirror may be stationarily positioned in said path of rays from said lamp and being partially light-permeable to pass infrared-component rays therethrough, said rays, after passing through said cold-light mirror, being then directed onto said infrared-component reflecting mirror and then back to said cold-light mirror.

The device according to the invention may further include an additional infrared component-reflecting mirror positioned behind said cold-light mirror, said additional infrared component-reflecting mirror being stationary and being arranged between said cold-light mirror and said at least one infrared component-reflecting mirror when the latter is positioned in the path of the rays passed through said cold-light mirror.

According to still another modification of the invention the device for sensing microfilms may comprise in addition to visible light a projection lamp radiating infrared-component rays; a cold-light mirror adapted to receive from said lamp radiation rays in a predetermined path; a microfilm platform for receiving a microfilm thereon; a projection lens positioned above said platform; a microfilm sensing means; a heat-protective filter positionable in said path before said platform and selectively movable into and away from said path, said cold-light mirror being stationarily positioned in said path and being partially light permeable to pass infrared-component rays therethrough; and an additional infrared component rays-radiation-source positioned behind said cold-light mirror and provided with a switch, said rays passing onto said cold-light mirror from said lamp, then onto said platform and being directed to said projection lens from which they are projected to said microfilm sensing means, and a coupling means for coupling said switch to said filter for moving said filter into and away from a path of said rays towards said platform.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
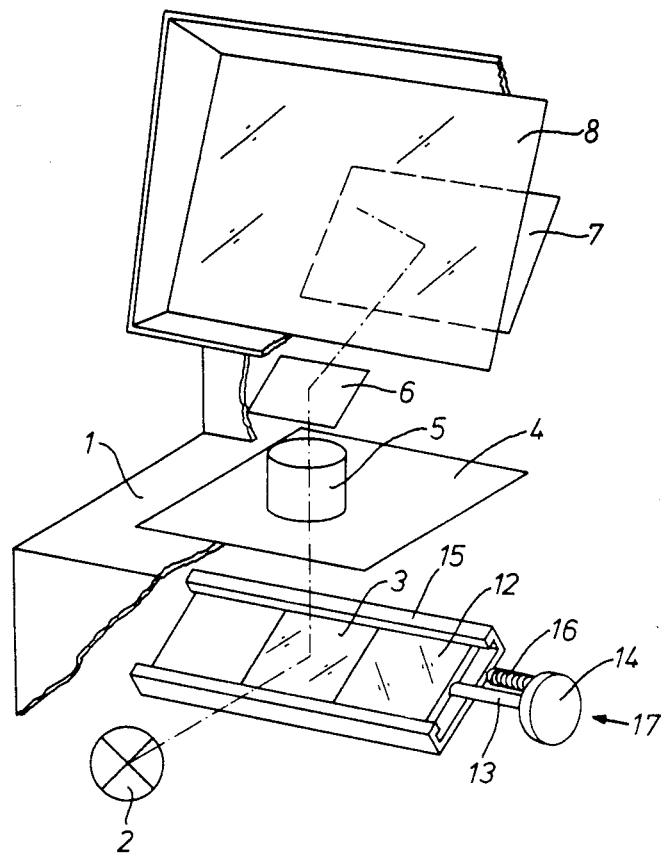
FIG. 1 is an exploded perspective view of the apparatus for sensing microfilms according to the invention, with a housing portion cut away.

Referring now to the drawings, and first to FIG. 1, the housing of the microfilm sensing device according to the invention is designated by a reference numeral 1. A lamp 2, which besides visible light also radiates an ultraviolet component, is disposed in housing 1. A deflection mirror 3, which is formed as a cold-light mirror, and which also does not substantially reflect an ultraviolet component is also mounted in housing 1. Deflection mirror 3 is inclined relative to the lamp 2 at the angle of about 45°. A microfilm platform 4 is positioned above mirror 3 and a projection lens or objective 5 is disposed above the microfilm platform. Further full-reflecting light-deflecting mirrors 6 and 7 and an image screen 8 are provided in the system. Between cold-light mirror 3 and microfilm platform 4 can also be installed a heat protective filter 9 and a condensor lens 10 shown in FIG. 3. Also between lamp 2 and cold light mirror 3 can be provided an illumination optics 11 as can be seen from FIG. 3.

In order to provide in a simple fashion a quick change or modification in a spectral combination of the illumination of the microfilm sensing apparatus for other purposes than sensing, for example for video scanning or mechanical scanning, the cold light mirror 3 is combined with a mirror 12 the reflection capacities of which lie in a required wave length spectrum. Therefore mirror 3 and mirror 12 are disposed on and connected to a common slide 13 provided with a hand grip 14. Slide 13 carrying thereon mirrors 3 and 12 and connected to grip 14 is displaceable in a guide 15 in the function plane of cold-light mirror 3 which is transversal to the path of illumination rays. This slide is operated under the action of a spring 16 which is tensioned or compressed against a non-illustrated stop in the position in which the cold-light mirror 3 lies in the path of illumination rays. If a quick change in a spectral combination of the illumination of a microfilm is required then slide 13 by means of hand trip 14 is displaced against the action of spring 16 in the direction of arrow 17 unless the slide abuts against a second non-illustrated stop so that the warm-light mirror 12 will lie in the path of illumination rays. Thereby the illumination of the microfilm is adjusted to another fashion of use of the sensing apparatus for as long as it is required. If hand grip 14 is released slide 13 together with mirrors 3 and 12 is urged back under the force of spring 16 to its initial position for a normal sensing operation.

Figure 2:
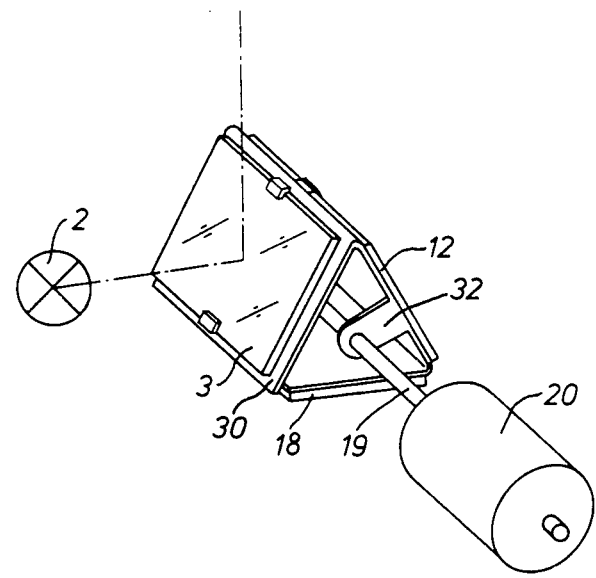
FIG. 2 is a perspective view of the sensing apparatus according to a modified embodiment of the invention.

FIG. 2 illustrates the arrangement in which the sensing apparatus of FIG. 1 is adjustable to three various spectral combinations of projection light. The cold-light mirror 3 is positioned on one side of a prism-shaped supporting member 30 of a triangular cross-section, while the warm-light mirror 12 is positioned on the second side or surface of prismatic supporting member 30. A further warm-light mirror 18 with further reflection capacities is arranged on the third side of supporting member 30. The prismatic supporting member 30 has an axis of symmetry, through which a shaft 19 extends, which passes through openings in brackets 32 of the supporting member 30 and is connected to an output shaft of a step motor 20 so that shaft 19 can be periodically turned about 120° for pivoting mirrors 3, 12 and 18 to thus selectively position one of the mirrors in the path of illumination rays emanated from lamp 2. It is of course understood that any suitable pivoting means other than step motor 20 can be provided in this apparatus. Motor 20 can be so operated that after the actuation of the motor the latter will reverse the mirror back into a desired sensing position. When motor 20 is not operated cold-light mirror 3 is always positioned in the path of illumination rays.

Figure 3:
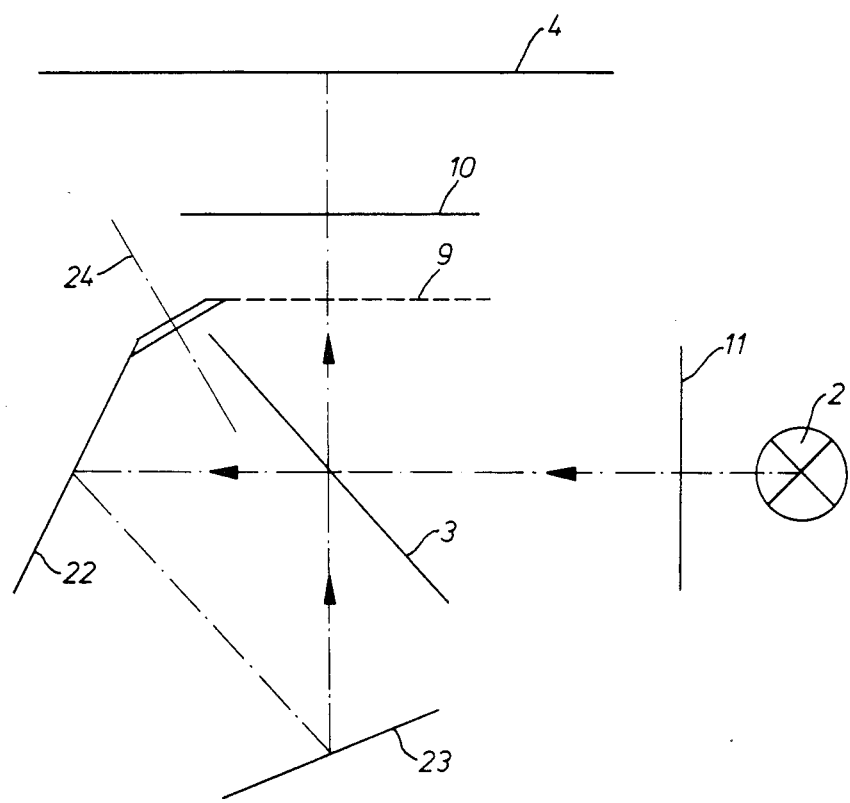
FIG. 3 is a schematic view of the device according to a further modification.

FIG. 3 schematically illustrates the path of light rays from lamp 2 towards the microfilm platform. In this embodiment the cold-light mirror 3 is formed as partially transparent or light-permeable mirror which allows an infrared component of the light to pass. In addition, the above-mentioned heat protective filter 9 is provided in the system as well as a condensor lens 10. Behind the cold-light mirror 3 are positioned two further infrared component-reflecting mirrors 22, 23 which are arranged at the same angle relative to mirror 3, so that mirrors 22, 23, which receive infrared rays, passed through the cold-light mirror 3, direct these infrared rays again to the cold-light mirror 3, these infrared rays passing again through mirror 3 and being used for illumination of the microfilm in the case of video or television scanning or mechanical scanning. The heat-protective filter 9 and the first warm-light mirror 22 are arranged on a common shaft 24 so that they are angularly offset relatively to each other. Shaft 24 can be rotated back and forth about a respective angle by the step motor according to the arrangement of FIG. 2. The first warm-light mirror 22 is located in the embodiment of FIG. 3 behind the mirror 3 whereby the heat-protective filter 9 shown by the phantom line can be pivoted out from the path of illumination rays. A normal light onto the film platform 4 is reflected by means of mirror 3 whereas an infrared component then passes through warm-light mirrors 22, 23 located behind mirror 3 and again onto mirror 3 and for the second time in the direction towards the microfilm platform 4. In the normal sensing position can the first warm-light mirror 22 be pivoted out from the path of illumination rays while the heat-protective filter 9 can be pivoted in to lie in the path of illumination rays so that the infrared component will not be allowed to pass to mirror 3 again. The directions of illumination rays are shown in FIG. 3 by arrows.

Figure 4:
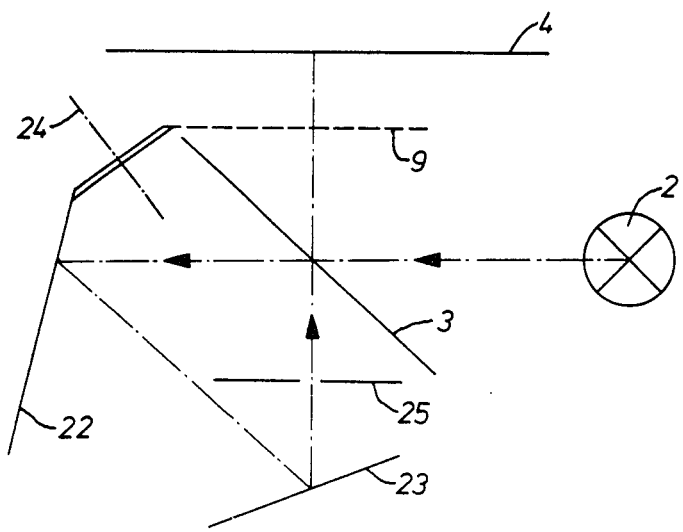
FIG. 4 is a schematic view of the device of the invention in accordance to yet another modification.

The embodiment of FIG. 4 differs from the embodiment of FIG. 3 in that a known photographic catch or lock 25, for example an electronically controlled catch, is provided between the second warm-light mirror 23 and the partially transparent cold-light mirror 3. This known photographic lock is operable to control the infrared component of the illumination rays so that it can be intermittent or can be controlled for a short period of time. This control can be so carried out that the lock is opened only during the scanning process for a video transmission or is opened by a sensing pin during the mechanical sensing process.

Figure 5:
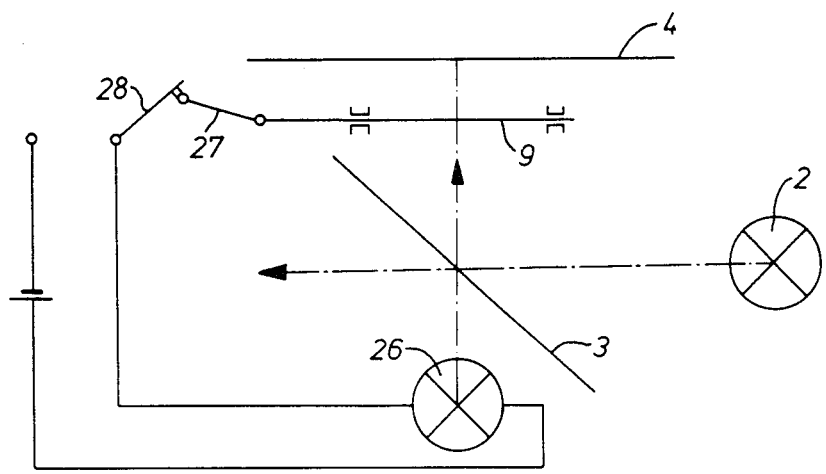
FIG. 5 is a schematic view of the device of the invention according to a still another modification.

In the embodiment of FIG. 5 an additional infrared lamp 26 is provided behind the partially transparent cold-light mirror 3 in place of the warm-light mirror. The heat-protective filter 9 is displaceable on a coupling member or a push rod 27 which is connected to a switch 28 provided for the infrared lamp 26. If switch 28 is closed the heat-protective filter 9 is pulled away from the position in which it lies in the path of illumination rays while the infrared lamp 26 is lightened. The light of lamp 26 passes through the cold-light mirror 3 and due to the pulling or pivoting the filter 9 away from the path of illumination rays is then permitted to pass onto the microfilm platform 4.

It will be understood that each of the elements described above, or two or more together, may also find a useful application in other types of microfilm sensing devices with projection lamps differing from the types described above.

While the invention has been illustrated and described as embodied in a microfilm sensing device with a projection lamp and cold-light mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for sensing microfilms, comprising at least one projection lamp radiating infrared-component rays in addition to visible light; a cold-light mirror adapted to receive from said lamp radiation rays in a predetermined path; a microfilm platform for receiving a microfilm thereon; a projection lens positioned above said platform; a microfilm sensing means; said rays passing onto said cold-light mirror from said lamp, then onto said platform and being directed to said projection lens from which they are projected to said microfilm sensing means; at least one infrared component-reflecting mirror; and means for selectively moving said infrared component-reflecting mirror into and away from said path of the rays before said microfilm platform.

2. The device as defined in claim 1, further including a heat-protective screen positionable in said path before said platform and selectively movable into and away from said path.

3. The device as defined in claim 1, wherein said microfilm sensing means is an image screen means.

4. The device as defined in claim 1, wherein said microfilm sensing means is a charge coupled device.

5. The device as defined in claim 1, wherein said moving means include a guide and a slide displaceably positioned in said guide, said slide carrying said cold-light mirror and said infrared component-reflecting mirror thereon and being operative for selectively positioning said cold-light mirror or said infrared component-reflecting mirror in said path of rays.

6. The device as defined in claim 5, wherein said moving means further include an actuating handle connected to said slide and a spring tensioned against said guide, said slide being displaceable by said handle and under the action of said spring into and from a position in which said cold-light mirror lies in said path of the rays.

7. The device as defined in claim 2, wherein two different infrared component-reflecting mirrors are provided.

8. The device as defined in claim 7, wherein said moving means include a pivotable supporting member of a prismatic shape having three supporting sides, said cold-light mirror being positioned on one of said sides and said two infrared component-reflecting mirrors being positioned on two remaining sides of said supporting member.

9. The device as defined in claim 8, wherein said moving means further include a turnable shaft extending through an axis of symmetry of said supporting member which is turned to position one of said mirrors in said path of the rays.

10. The device as defined in claim 9, wherein said moving means further include a step motor connected to said shaft.

11. The device as defined in claim 2, wherein said cold-light mirror is stationarily positioned in said path of rays from said lamp and being partially light-permeable to pass infrared-component rays therethrough, said rays after passing through said cold-light mirror being directed onto said infrared-component reflecting mirror and then back to said cold-light mirror.

12. The device as defined in claim 11, further including an additional infrared component-reflecting mirror being stationary and being arranged between said cold-light mirror and said at least one infrared component-reflecting mirror when the latter is positioned in the path of the rays passed through said cold-light mirror; and a heat-protective filter positionable in said path behind said cold-light mirror.

13. The device as defined in claim 1, wherein said moving means are pivoting means for pivoting said at least one infrared component-reflecting mirror and said filter into and away from said path.

14. The device as defined in claim 13, further including a photographic catch arranged between said additional mirror and said cold-light mirror.

15. A device for sensing microfilms, comprising in addition to visible light a projection lamp radiating infrared-component rays; a cold-light mirror adapted to receive from said lamp radiation rays in a predetermined path; a microfilm platform for receiving a microfilm thereon; a projection lens positioned above said platform; a microfilm sensing means; a heat-protective filter positionable in said path before said platform and selectively movable into and away from said path, said cold-light mirror being stationarily positioned in said path and being partially light-permeable to pass infrared component rays therethrough; and an additional infrared-component rays radiation-source positioned behind said cold-light mirror and provided with a switch, said rays passing onto said cold-light mirror from said lamp, then onto said platform and being directed to said projection lens from which they are projected to said microfilm sensing means, and a coupling means for coupling said switch to said filter for moving said filter into and away from a path of said rays towards said platform.

* * * * *